United States Patent
Lin

(10) Patent No.: US 9,110,206 B2
(45) Date of Patent: Aug. 18, 2015

(54) LIGHT GUIDE PLATE AND BACKLIGHT MODULE HAVING THE LIGHT GUIDE PLATE

(71) Applicant: HON HAI PRECISION INDUSTRY CO., LTD., New Taipei (TW)

(72) Inventor: Chen-Han Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/256,073

(22) Filed: Apr. 18, 2014

(65) Prior Publication Data

US 2014/0313768 A1    Oct. 23, 2014

(30) Foreign Application Priority Data

Apr. 19, 2013  (TW) .............................. 102113869 A

(51) Int. Cl.
*G09F 13/04* (2006.01)
*G09F 13/08* (2006.01)
*F21V 8/00* (2006.01)

(52) U.S. Cl.
CPC ............ *G02B 6/0036* (2013.01); *G02B 6/0031* (2013.01); *G02B 6/0053* (2013.01)

(58) Field of Classification Search
CPC .............................. G02B 6/0036; G02B 6/0053
USPC .................................. 362/97.1–97.4, 619–620
See application file for complete search history.

(56) References Cited

U.S. PATENT DOCUMENTS 7,393,131 B2 *  7/2008  Yu et al. ........................ 362/620

* cited by examiner

*Primary Examiner* — Jason Moon Han
(74) *Attorney, Agent, or Firm* — Novak Druce Connolly Bove + Quigg LLP

(57) ABSTRACT

A light guide plate includes a light incident surface for incident light, a light emitting surface for emitting the light, and microstructures formed on the light emitting surface to collimate the light.

16 Claims, 2 Drawing Sheets

LIGHT GUIDE PLATE AND BACKLIGHT MODULE HAVING THE LIGHT GUIDE PLATE

FIELD

The present disclosure relates to backlight modules and, particularly, to a light guide plate and a backlight module having the light guide plate.

BACKGROUND

To increase an illumination brightness of the backlight modules, high power light sources are required, which increase manufacturing and use costs of the backlight modules.

Therefore, it is desirable to provide a light guide plate and a backlight module having a light guide plate that can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Embodiments of the present disclosure will be described with reference to the drawings.

Figure 1:
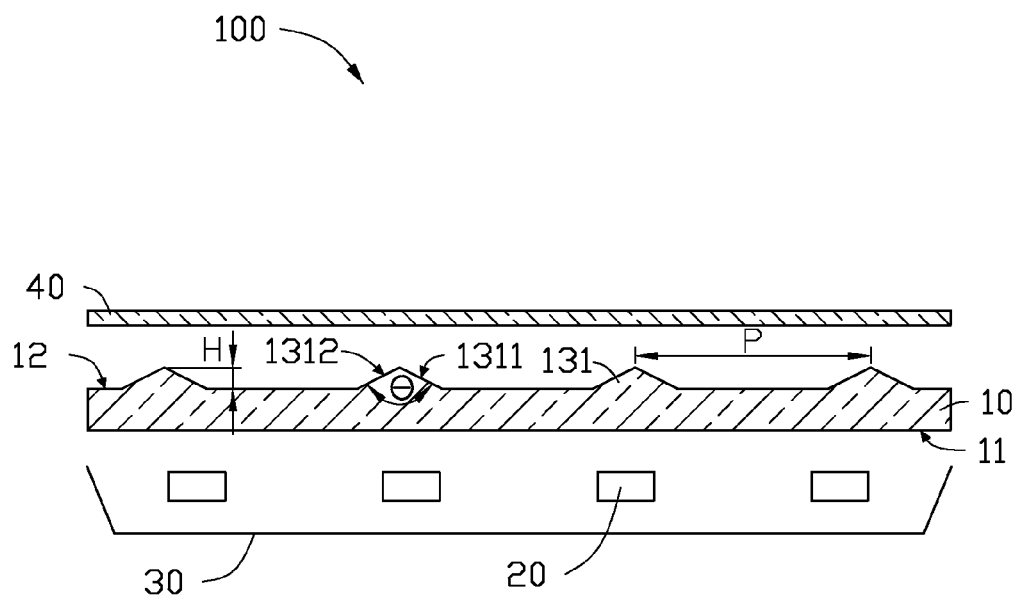
FIG. 1 is a cross-sectional schematic view of a backlight module, according to an embodiment.
Figure 2:
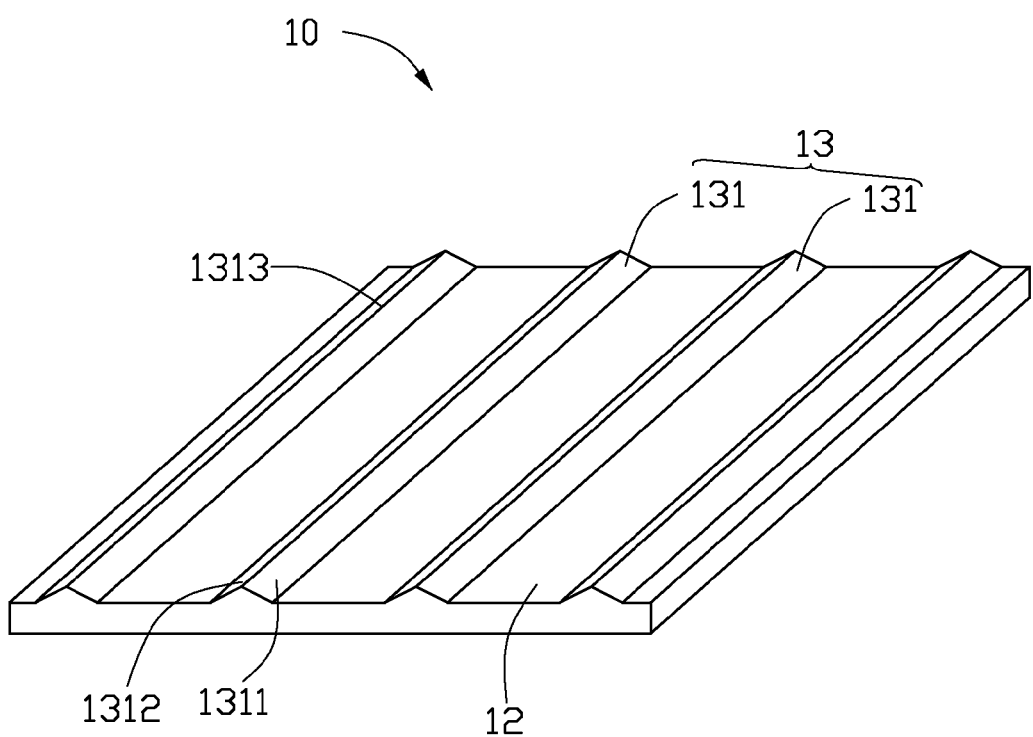
FIG. 2 is an isometric schematic view of a light guide plate of the backlight module of FIG. 1.

FIGS. 1-2 show a backlight module 100 that includes a light guide plate 10, a number of light sources 20, a reflective sheet 30, and a brightness enhancement film 40.

The light guide plate 10 can be made of polycarbonate, polymethyl methacrylate (PMMA), methyl methacrylate, styrene copolymer (MS), polyethylene terephthalate (PETG), polystyrene (PS) or any compound thereof.

The light guide plate 10 is substantially rectangular and includes a light incident surface 11 and a light emitting surface 12 opposite to the light incident surface 11. The light guide plate 10 also includes microstructures 13 formed on the light emitting surface 12.

In this embodiment, the microstructures 13 include a number of triangular prisms 131 bulged up from the light emitting surface 12. The triangular prisms 131 are arranged in parallel with each other and extend through the light emitting surface 12 along a direction that is substantially parallel with a widthwise direction or a lengthwise direction of the light emitting surface 12. Each triangular prism 131 includes a first surface 1311 and a second surface 1312, each of which connects each other and the light emitting surface 12. In this embodiment, a cross-section of the triangular prism 131 is substantially an isosceles triangle.

An included angle $\theta$ between the first surface 1311 and the second surface 1312 falls in a range from about 130 degrees to about 170 degrees or from about 130 degrees to about 150 degrees, or is about 130 degrees. An intersecting line 1313 of the first surface 1311 and the second surface 1312 is substantially parallel with the light emitting surface 12. A distance H between the intersecting line 1313 and the light emitting surface 12 falls in a range from about 1.3 microns to 5.5 microns or from about 4 microns to about 5.5 microns, or is about 5.5 microns. A pitch P between each two adjacent intersecting lines 1313 falls in a range from about 30 microns to about 50 microns or from about 40 to about 50 microns, or is about 50 microns.

The light sources 20 are positioned at a side of the light incident surface 11 and are configured for emitting light to the light incident surface 11. As such, the light can be collimated by the microstructures 131 to increase illumination brightness of the backlight module 100 in the normal direction. In detail, experimental results show that, within the ranges specified above, the collimation of the light increases with the decreasing of the included angle $\theta$ and the increasing of the distance H and the pitch P. That is, the collimation of the light can reach the maximum when the included angle $\theta$ is about 130 degrees, the distance H is about 5.5 microns, and the pitch P is about 50 microns.

The reflective sheet 30 is positioned at a side of the light sources 20 opposite to the light guide plate 10 and is configured for reflecting the light to the light incident surface 11 to increase illumination brightness of the backlight module 100.

The brightness enhancement film 40 is positioned at a side of the light emitting surface 12 to further increase the illumination brightness of the backlight module 100.

It will be understood that the above particular embodiments are shown and described by way of illustration only. The principles and the features of the present disclosure may be employed in various and numerous embodiments thereof without departing from the scope of the disclosure. The above-described embodiments illustrate the possible scope of the disclosure but do not restrict the scope of the disclosure.

What is claimed is:

1. A light guide plate for a direct backlight, comprising:
a light incident surface for receiving incident light;
a light emitting surface for emitting the light; and
microstructures formed on the light emitting surface to collimate the light, wherein the microstructures comprise a plurality of triangular prisms bulged up from the light emitting surface, the triangular prisms are arranged in parallel with each other and extend through the light emitting surface along a direction that is substantially parallel with a widthwise direction or a lengthwise direction of the light emitting surface, each triangular prism comprises a first surface and a second surface, each of which connects each other and the light emitting surface, an included angle between the first surface and the second surface falls in a range from about 130 degrees to about 170 degrees, an intersecting line of the first surface and the second surface is substantially parallel with the light emitting surface, a distance between the intersecting line and the light emitting surface falls in a range from about 1.3 microns to 5.5 microns, and a pitch between each two adjacent intersecting lines falls in a range from about 30 microns to about 50 microns.

2. The light guide plate of claim 1, wherein the included angle falls into a range from about 130 degrees to about 150 degrees.

3. The light guide plate of claim 1, wherein the included angle is about 130 degrees.

4. The light guide plate of claim 1, wherein the distance falls in a range from about 4 microns to about 5.5 microns.

5. The light guide plate of claim 1, wherein the distance is about 5.5 microns.

6. The light guide plate of claim 1, wherein the pitch falls into a range from about 40 microns to 50 microns.

7. The light guide plate of claim 1, wherein the pitch is about 50 microns.

8. The light guide plate of claim 1, wherein a cross-section of the triangular prism is substantially an isosceles triangle.

9. A direct backlight module, comprising:
a plurality of light sources for emitting light;
a light guide plate, including a light incident surface facing the light sources for receiving the light, a light emitting surface for emitting the light, and microstructures formed on the light emitting surface to collimate the light, wherein the microstructures comprise a plurality of triangular prisms bulged up from the light emitting surface, the triangular prisms are arranged in parallel with each other and extend through the light emitting surface along a direction that is substantially parallel with a widthwise direction or a lengthwise direction of the light emitting surface, each triangular prism comprises a first surface and a second surface, each of which connects each other and the light emitting surface, an included angle between the first surface and the second surface falls in a range from about 130 degrees to about 170 degrees, an intersecting line of the first surface and the second surface is substantially parallel with the light emitting surface, a distance between the intersecting line and the light emitting surface falls in a range from about 1.3 microns to 5.5 microns, a pitch between each two adjacent intersecting lines falls in a range from about 30 microns to about 50 microns; and
a reflective sheet positioned at a side of the light sources opposite to the light guide plate and configured to reflect light from the light sources into the incident surface.

10. The backlight module of claim 9, wherein the included angle falls into a range from about 130 degrees to about 150 degrees.

11. The backlight module of claim 9, wherein the included angle is about 130 degrees.

12. The backlight module of claim 9, wherein the distance falls in a range from about 4 microns to about 5.5 microns.

13. The backlight module of claim 9, wherein the distance is about 5.5 microns.

14. The backlight module of claim 9, wherein the pitch falls into a range from about 40 microns to 50 microns.

15. The backlight module of claim 9, wherein the pitch is about 50 microns.

16. The backlight module of claim 9, wherein a cross-section of the triangular prism is substantially an isosceles triangle.

* * * * *